Oct. 21, 1952  C. M. WOODWARD  2,614,788
CLAMP
Filed May 17, 1946
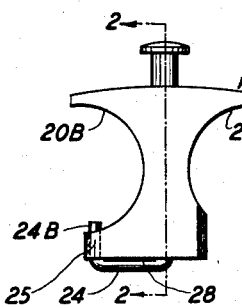
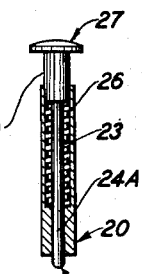
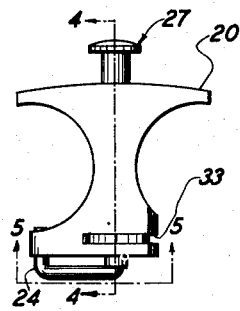
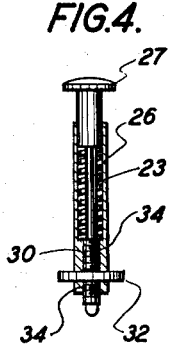
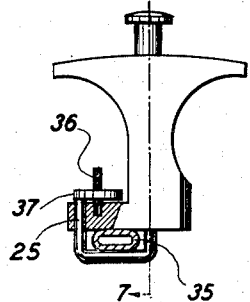
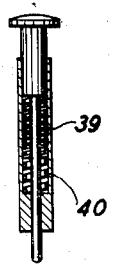
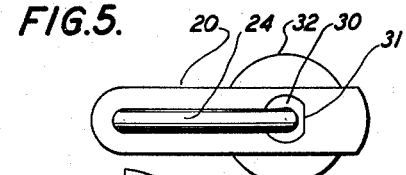
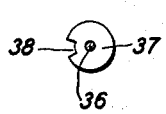
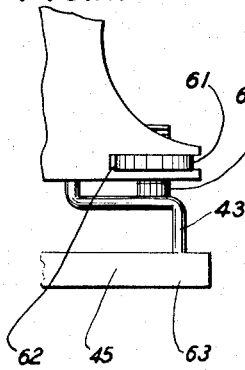
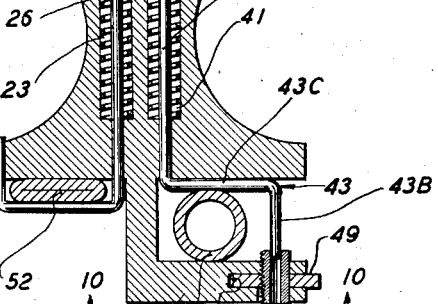
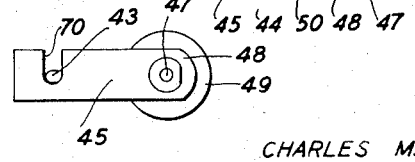
INVENTOR.
CHARLES M. WOODWARD
BY
ATTORNEYS Patented Oct. 21, 1952

2,614,788

UNITED STATES PATENT OFFICE 2,614,788

CLAMP

Charles M. Woodward, Pasadena, Calif.

Application May 17, 1946, Serial No. 670,474

9 Claims. (Cl. 251—5)

This invention is concerned with clamps, particularly pinch clamps for control of fluid flow in resilient tubing. In its preferred form it finds application in control of the flow of anesthetics while these are being introduced intravenously and provides an improved clamp that assures positive and convenient flow control without leakage when complete shut-off is required. Moreover, the clamp is so constructed that it can be slid on or off the tube laterally, so that it can be placed in operating position even when the ends of the tube are not free and do not permit placing the clamp by sliding over one free end.

The control of the flow of an anesthetic being administered intravenously is accomplished customarily by a pinch clamp placed on a rubber tube or the like through which the anesthetic flows from a head tank or burette to a syringe or hypodermic needle. The total quantity administered and the rate of administration must be controlled accurately, and the stoppage or interruption of flow at the appropriate time should be positive, since leakage may mean that excessive anesthetic reaches the patient, with serious and possibly fatal result. Clamps heretofore available have not been entirely satisfactory, and in many instances serious accidents have occurred due to the fact that flow of the anesthetic continued, though at a slow rate, after the pinch clamp was supposedly closed. Furthermore, pinch clamps heretofore available for the above described purpose and similar uses do not permit the clamp to be placed on the tube or removed therefrom except over a free end. This is a serious objection, because after both ends of the tubing are engaged, for example, one end being engaged by the burette or head tank and the other end being engaged by the syringe, an ordinary clamp cannot be installed or removed.

As a result of my investigations, I have developed an improved type of pinch clamp which is convenient to use and may be operated with one hand. It is so constructed that it assures that the tube will be properly pinched and will be completely closed as desired. Moreover, in the preferred form of my pinch clamp, the opening may be adjusted to any predetermined amount, so that when necessary a regulated amount may be run at predetermined and constant rate. Thirdly, the pinch clamp of my invention is so constructed that the clamping means may be swung to one side to insert the tubing at any point along the length thereof.

In summary, my invention contemplates the combination in a pinch clamp which comprises a first clamp member having a clamping surface on one end and a bore running through it to the other end, a second U-shaped clamp member having a long leg and a short leg substantially parallel to each other with a clamping surface in between, the long leg being slidably and rotatably mounted in the bore and the short leg being slidably mounted in a second bore in the first member, springing means for pressing the two clamping surfaces toward each other, and means attached to the long leg and projecting outside the first member at the end opposite its clamping surface for rotating the long leg and sliding it sufficiently to move the short leg out of the second bore.

In my preferred structure, the springing means is a helical spring mounted within the first member, preferably in the first bore and coaxial with the long leg.

The means for rotating and sliding the long leg in its bore preferably is a button attached to the free end of the long leg, i. e. the end opposite the clamping means.

In my preferred structure, I provide a light helical spring and also a heavy helical spring disposed coaxially with each other and with the long leg in the first bore. A light spring gives adequate movement of the clamp for its intended purpose, and it is compressed first. Upon further sliding of the long leg the heavy helical spring is compressed sufficiently that the short leg may be slid from its bore and swung to one side, so that the tubing can be inserted in or removed from the clamp. Preferably, the light helical spring and the heavy helical spring are placed end to end in the first bore, although they may be placed one over the other and coaxially.

In one type of the clamp of my invention, I provide adjustable stopping means for regulating the distance to which the clamping surfaces may approach each other. It permits the clamping surfaces to be adjusted to maintain a constant flow through the tubing if and when such is desired. The adjustable stopping means may comprise a threaded bushing through which one leg of the second clamping member passes coaxially. A control wheel is journaled in the first member and threaded around the bushing and the bushing is so disposed that it moves longitudinally but does not turn. By turning the wheel, the longitudinal movement of the bushing is accomplished and controlled.

In a further modification of my invention, I provide dual clamps, one of which tends to remain closed and the other of which tends to remain open. Both are mounted on the same main member or base. Apparatus of this type is particularly useful in the administration of certain types of intravenous anesthetics, when a first anesthetic or reagent is run in for a certain period, then completely interrupted and replaced by the flow of a second anesthetic or reagent. This dual clamping mechanism is also designed for one-hand operation.

These and other aspects of my invention will be understood more thoroughly in the light of the following detailed description taken in conjunction with the accompanying drawings in which Fig. 1 is a side elevation of one form of the clamp of my invention;

Fig. 2 is a sectional elevation of the clamp of Fig. 1, taken along the line 2—2;

Fig. 3 is a side elevation of a modified form of the clamp of Fig. 1, provided with one type of adjustable stopping means;

Fig. 4 is a sectional elevation taken through the clamp of Fig. 3 along the line 4—4;

Fig. 5 is a bottom view of the clamp of Figs. 3 and 4, illustrating the use of an adjustable bushing as a stopping means;

Fig. 6 is a sectional elevation of a further modification of the clamp of the invention provided with another type of stopping means;

Fig. 7 is a sectional elevation through the clamp of Fig. 6, taken along the line 7—7 and illustrating the use of two helical springs, one light and one heavy;

Fig. 8 is a plan view of the adjusting nut of the stopping means of Figs. 6 and 7;

Fig. 9 is a sectional elevation through a dual clamp mechanism of my invention adapted to control two tubes;

Fig. 10 is a fragmentary bottom view of a portion of the clamp of Fig. 9; and

Fig. 11 illustrates a modification of the clamp of Figs. 9 and 10.

Referring to Figs. 1 and 2, it will be observed that the clamp comprises a main member or body 20 having two transverse branches or lugs 20A, 20B, adapted to be grasped by the fingers. The lower end of the main member has a flat clamping surface. As shown in Fig. 2, the body has a central bore 23 through which passes the long leg 24A of a U-shaped clamping member 24 made of bent rod of circular cross section. The long leg fits the lower part of the cylindrical bore, and can be slid and rotated therein. The other leg 24B of the U member is shorter but parallel to the long leg and passes through a second bore 25 in the outer portion of the body.

The central bore has an enlarged upper portion within which a helical spring 26 is disposed concentrically around the long leg. The upper end of the long leg is screwed into a button 27 which has an enlarged upper portion and a lower cylindrical shank portion 27A of approximately the same diameter as the enlarged portion of the bore. The length of the lower portion of the button is such that when the button is compressed completely against the main member (which comprises the spring between the button and the bottom of the enlarged or upper portion of the bore), the short leg of the U comes out of its bore 25 and is free to be rotated to one side. The rest of the time the spring tends to hold the short leg in its bore, compressing a piece of tubing or the like (not shown) held between the clamping surfaces, i. e. the bottom of the body and the bottom of the U.

The apparatus of Fig. 1 is simple, and yet highly effective. The body is so designed as to fit between two fingers of one hand while the thumb compresses the button and opens the clamp. A slight pressure on the button is sufficient to open the clamp and an enclosed tube (not shown). Additional pressure applied on the button opens the clamp to the point where the short leg can be slid out of its bore, for example by rotating the button, so that the enclosed tube can be removed.

The two clamping surfaces are such that the tube cannot become kinked or only partially compressed, for if the tube is enclosed its entire cross section must be compressed between two parallel straight surfaces.

When no pressure is applied to the button, the spring causes the clamp to remain closed, thus effectively shutting off an enclosed tube.

Referring now to Figs. 3, 4, and 5 it will be observed that the structure illustrated is substantially identical to that of Figs. 1 and 2, like parts being indicated by like numerals, but with the following additions. The long leg of the U, instead of passing directly through a small lower bore, instead passes through a bushing 30 which slides longitudinally in the bore. The bushing is flat on one side 31, as shown in Fig. 5, and the remaining cylindrical surface of the bushing is threaded to fit the interior thread of an adjusting wheel 32. This adjusting wheel is placed in a slot 33 through which the bushing passes in an unthreaded bore having one flat side (see Fig. 5) to prevent the bushing from turning. By adjusting the wheel, the bushing may be turned upward or downward. The lower portion of the bushing bears on the inside or bottom of the U, and when the wheel is screwed sufficiently, it will prevent the clamp from closing completely. Thus the clamp of Figs. 3, 4 and 5 may be adjusted for any set opening. This is particularly useful when a drip method of administering an anesthetic or other reagent is employed.

Passing to a consideration of Figs. 6, 7, and 8 it will be observed that the mechanism illustrated thereby is like that of Figs. 1 and 2. However, in Fig. 6 the clamp is shown partly compressed, i. e. partly open with a hose 35 between the clamping surfaces.

The clamp is held in this position by means of an adjustable stop comprising a vertical threaded shank 36 the lower end of which is threaded into the body inside and parallel to the bore 25 in which the short leg of the U-member slides. A threaded wheel 37 is screwed onto the shank and covers the bore 25 except when a cutout segment 38 (see Fig. 8) is turned over the bore. The wheel may be adjusted as to height by turning it on the shank, and by placing the cut-out segment out of the line of the lower leg, the wheel acts as a stop and prevents the clamp from seating completely. However, a slight turn of the wheel in either direction will permit the short end of the U to snap up through the cut-out segment of the wheel so that the clamp is free to compress the hose to the limit of its spring.

Another important distinction between the apparatus of Figs. 6 and 7 and that of Figs. 1 and 2 is the fact that it is provided with two helical springs, an upper helical spring 39 of light gauge (so that it is easily compressed) and a lower and somewhat shorter and coarser helical spring 40 which is compressed with somewhat more difficulty. The spring 39 is compressed first, and is long enough to accommodate the normal motion of the clamp. However, when it is necessary to open the clamp to insert or take out a tube, the button is pressed until it almost touches the body of the clamp whereupon the lower and heavier spring is compressed so that the short leg of the U can be swung out of its bore.

It will be apparent that the springs 39, 40 may be reversed in position and that two telescoped springs, one coarse and one fine, can also be employed. However, the structure illustrated is preferred.

As I have already indicated, there are certain methods of intravenous anesthesia which require the addition of two reagents in series. The clamp of Figs. 9, 10 and 11 is adapted to this purpose. The left side of the clamp is substantially the same as that of Figs. 1 and 2, like parts being indicated by like reference characters. However, the shank or center of the main clamp body 20 is thicker, so as to accommodate an extra bore 41 parallel to the first bore 23. In the upper or enlarged portion of this bore is a helical spring 42 which normally is under slight compression as is its companion spring 26 in the other bore. Through the spring and through the bore passes an additional clamping member 43 having a long upper leg 43A and a short lower leg 43B, joined by a third portion 43C, transverse to both legs. Thus the clamping member 43 is in general S-shaped rather than U or L-shaped, and may be made by bending a cylindrical rod. The lower leg, it will be observed, is shorter than the upper leg and parallel to it but extends in the opposite direction from the central piece 43C. It is held by the spring in the opposition shown in the sketch so that a flexible tube 44, placed in the clamp between the S-shaped member and an extension 45 on the bottom of the clamp is normally open. A long button 46 is threaded onto the top of the S-shaped clamping member, the lower cylindrical shank 46A of this button being of the same diameter as the enlarged upper portion of the bore.

The L-shaped extension 45 on the lower part of the clamp is formed integrally with the main clamp body 20 and its bottom branch is parallel to the central portion 43C of the S-shaped member so that there is a slot with parallel sides between the body proper and the bottom of the extension.

The lower leg 43B of the S-shaped member is adapted to slide in a bore 47 in a bushing 48, which is in general constructed like the bushing of the apparatus of Figs. 3, 4 and 5, being flat on one side as shown in Fig. 10 and threaded on the rest of its circumference. The bushing 48 is located in a bore in the extension 45 on the bottom of the clamp. The bore is slightly larger than the bushing so that the bushing is free to move up or down inside the bore. An operating wheel 49 is threaded around the bushing and placed in a horizontal slot 50 in the lower extension. By turning the operating wheel, the bushing may be screwed down and depressed sufficiently that the lower leg of the S-shaped member may be swung to one side by turning the upper button to permit the removal of the leg 43B.

In the operation of the apparatus of Figs. 9 and 10, liquid is first run through the tube 44 (mounted in the right hand side of the clamp) in desired amount and then the button 46 is compressed until no further movement is possible. This effectively closes the tube 44. Further movement of a thumb applied to the button 46 will press the other button 27 and cause it to move nearer the body 20 so that the attached U-shaped clamping means 24 is opened, thereby permitting a tube 52 to open so that flow through this tube is established. The whole operation can be conducted with one hand, one thumb manipulating both buttons.

In the apparatus of Fig. 9 the bushing, and its accompanying operating wheel, do not serve the same function as the bushing and operating wheel in the apparatus of Figs. 3, 4 and 5. On the contrary, the bushing and wheel in the apparatus of Figs. 9 and 10 are adapted to lock the S-shaped member in operating position after the tube has been inserted.

The bushing and operating wheel employed as a locking means in the apparatus of Figs. 9 and 10 may be placed in another position. This is illustrated in Fig. 11, wherein it will be seen that another bushing 60 stands vertically in the main frame above the horizontal portion of the S-member. This bushing is like that of Figs. 9 and 10, flat on one side and threaded on the rest of its circumference and slides in a vertical bore which likewise is flat on one side. An operating wheel 61 is threaded around the bushing in a horizontal slot 62. By turning the operating wheel, the bushing may be screwed down so that the lower leg 43B of the S-member is locked in a bore 63 in the extension 45 of the main frame or member. Thus the locking means of Fig. 11 is substantially the same as with that of Figs. 9 and 10, the principal difference being that it is disposed in another position.

It should be noted that the lower extension of the clamp of Figs. 9 and 10 is provided with a slot 70 to permit the S-shaped member to be slid up into the bore 41 of the apparatus. This aids in assembly.

I claim:

1. In a pinch clamp, the combination which comprises a first clamp member having a clamping surface on one end and a bore running through it to the other end, a second U-shaped member having a long leg and a short leg substantially parallel to each other with a clamping surface in between, the long leg being slidably and rotatably mounted in the bore, and the short leg being slidably mounted in a second bore in the first member, the clamping surface of the U-shaped member being located in the projection of the clamping surface of the first clamp member, springing means for pressing the two clamping surfaces toward each other, and means attached to the long leg and projecting outside the first member at the end opposite its clamping surface for rotating the long leg and sliding it sufficiently to move the short leg out of the second bore.

2. In a pinch clamp, the combination which comprises a first clamp member having a clamping surface on one end and a bore running through it to the other end, a second U-shaped member having a long leg and a short leg substantially parallel to each other with a clamping surface in between, the long leg being slidably and rotatably mounted in the bore, and the short leg being slidably mounted in a second bore in the first member, the clamping surface of the U-shaped member being located in the projection of the clamping surface of the first clamp member, a helical spring mounted within the first member for pressing the two clamping surfaces to each other, and means attached to the long leg and projecting outside the first member at the end opposite its clamping surface for rotating the long leg and sliding it sufficiently to move the short leg out of the second bore.

3. In a pinch clamp, the combination which comprises a first clamp member having a clamping surface on one end and a bore running through it to the other end, a second U-shaped member having a long leg and a short leg substantially parallel to each other with a clamping surface in between, the spacing between the clamping surfaces of the first and second members being substantially equal throughout the length of the surfaces, the long leg being slidably and rotatably mounted in the bore, and the short leg being slidably mounted in a second bore in the first member, the clamping surface of the U-shaped member being located in the projection of the clamping surface of the first clamp member, a helical spring mounted within the first member coaxial with the long leg for pressing the two clamping surfaces to each other, and means attached to the long leg and projecting outside the first member at the end opposite its clamping surface for rotating the long leg and sliding it sufficiently to move the short leg out of the second bore.

4. Apparatus according to claim 3 in which the means for rotating and sliding the long leg is a button attached to its free end.

5. In a pinch clamp, the combination which comprises a first clamp member having a clamping surface on one end and a bore running through it to the other end, a second U-shaped member having a long leg and a short leg substantially parallel to each other with a clamping surface in between, the long leg being slidably and rotatably mounted in the bore, and the short leg being slidably mounted in a second bore in the first member, the clamping surface of the U-shaped member being located in the projection of the clamping surface of the first clamp member, a light helical spring and a heavy helical spring disposed coaxial with the long leg in the first bore for pressing the two clamping surfaces to each other, and means attached to the long leg and projecting outside the first member at the end opposite its clamping surface for rotating the long leg and sliding it sufficiently to move the short leg out of the second bore.

6. Apparatus according to claim 5 in which the two springs are placed end to end in the first bore.

7. In a pinch clamp, the combination which comprises a first clamp member having a clamping surface on one end and a bore running through it to the other end, a second U-shaped member having a long leg and a short leg substantially parallel to each other with a clamping surface in between, the long leg being slidably and rotatably mounted in the bore, and the short leg being slidably mounted in a second bore in the first member, spring means for pressing the two clamping surfaces toward each other, means attached to the long leg and projecting outside the first member on its end opposite its clamping surface for rotating the long leg and sliding it sufficiently to move the short leg out of the second bore, and adjustable stopping means for regulating the distance to which the two clamping surfaces may approach each other.

8. Apparatus according to claim 7 in which the adjustable stopping means comprises a threaded bushing through which a leg of the second member passes coaxially, and a wheel journaled in the first member and threaded around the bushing.

9. In a pinch clamp, the combination which comprises a first clamp member having a clamping surface on one end and a bore running through it to the other end, lugs extending transversely on each side of the bore adjacent that other end, a second U-shaped member having a long leg and a short leg substantially parallel to each other with a clamping surface in between, the clamping surfaces of the first and second members having mating contours, the long leg being slidably and rotatably mounted in the bore, and the short leg being slidably mounted in a second bore in the first member, the clamping surface of the U-shaped member being located in the projection of the clamping surface of the first clamp member, spring means for pressing the two clamping surfaces toward each other, and means attached to the long leg and projecting outside the first member at said other end for rotating the long leg and sliding it sufficiently to move the short leg out of the second bore.

CHARLES M. WOODWARD.

REFERENCES CITED

The following references are of record in the file of this patent:

UNITED STATES PATENTS

| Number | Name | Date |
|---|---|---|
| 936,982 | Briggs | Oct. 12, 1909 |
| 994,089 | Bengston | May 30, 1911 |
| 1,131,162 | Sackett | Mar. 9, 1915 |
| 1,496,209 | Davis | June 3, 1924 |
| 1,585,587 | Kneemueller | May 18, 1926 |
| 1,715,353 | Cordley | June 4, 1929 |
| 2,185,733 | Kaufman | Jan. 2, 1940 |
| 2,319,377 | Wallace | May 18, 1943 |